F. J. LICHTY.
FENCE.
APPLICATION FILED DEC. 2, 1908.
947,556.
Patented Jan. 25, 1910.
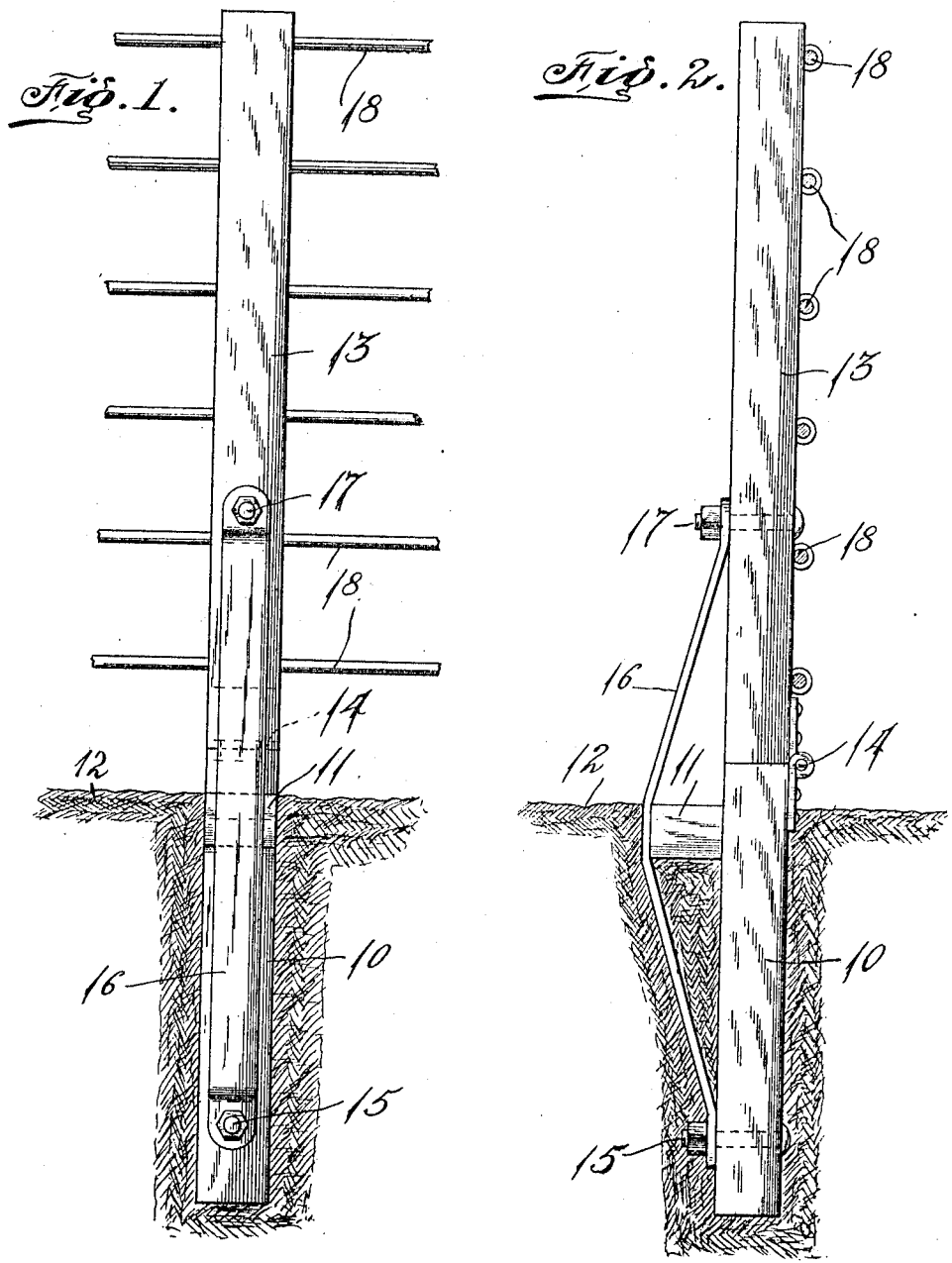
Witnesses
Jos Gregory
C. H. Woodward
Inventor
Frank J. Lichty
By
Chandler & Chandler
Attorneys

UNITED STATES PATENT OFFICE.

FRANK J. LICHTY, OF ROCKFORD, OHIO.

FENCE.

947,556.
Specification of Letters Patent.
Patented Jan. 25, 1910.

Application filed December 2, 1908. Serial No. 465,608.

*To all whom it may concern:*

Be it known that I, FRANK J. LICHTY, a citizen of the United States, residing at Rockford, in the county of Mercer, State of Ohio, have invented certain new and useful Improvements in Fences; and I do hereby declare the following to be a full, clear, and exact description of the invention, such as will enable others skilled in the art to which it appertains to make and use the same.

This invention relates to certain improvements in fences, and has for one of its objects to provide a simply arranged structure which may be folded or disposed flat-wise upon the ground when required.

Another object of the invention is to improve the construction and increase the efficiency and utility of structures of this character.

With these and other objects in view, the invention consists, generally, in a plurality of base posts embedded in the ground at spaced intervals along the line of the fence and with an upper post bearing upon each of the base posts and hingedly united thereto and with means for bracing the upper post members relative to the base posts.

The invention further consists in certain novel features of construction as hereinafter shown and described, and then specifically pointed out in the claim, and in the drawings illustrative of the preferred embodiment of the invention, Figure 1 is a front elevation of a post constructed in accordance with the invention. Fig. 2 is a side elevation partly in section of the same.

The improved fence post herein shown and described is designed more particularly for use in cold countries where accumulations of ice and snow are liable to occur, which frequently destroy fences, and it is the principal object of the invention to provide a fence post which may be folded down flatwise upon the ground together with the fence structure before the snow and ice season commences, so that the fence will be protected from damage from accumulations of snow and ice, and which may be again erected after the cold weather has passed, and without destroying any portions of the fence or detaching any of its parts.

The improved device comprises a plurality of base posts 10 embedded in the ground along the line of the fence and spaced apart the usual distances, each base post having a lateral block 11 extending from one side, preferably with its upper face even with the surface of the ground indicated at 12. Bearing upon each of the base posts 10 is an upper post 13, each upper post hingedly united to the base post at 14, the hinges located at the side opposite to the blocks 11, as shown.

Connected at 15, to each base post 10 is a rod 16, the rods extending upwardly and outwardly from their lower ends and bearing against the outer faces of the blocks 11 and with their upper ends directed inwardly and detachably coupled as by bolts 17 to the upper posts 13. By this means, the upper posts 13 are firmly braced and supported on one side, while the hinges 14 firmly support them on the other side.

The fence structure will be fastened to the post in any suitable manner, and any suitable fence structure may be employed, but for the purpose of illustration, strand wires 18 are shown connected to the post.

The base posts 10 and the upper posts 13 may be of wood, metal, or concrete, or partly of each material, and it is not desired, therefore, to limit the improvement to any specific material for the various parts.

The improved fence is simple in construction, can be inexpensively manufactured, and employed in localities where fences of various kinds are required, but as above stated, is more particularly adapted for use in cold climates where accumulations of snow and ice are liable to occur.

What is claimed is:

In a fence post the combination of a base member inserted into the ground, an upper member hingedly united to said base and swinging in one direction therefrom, a block extending from said base at the side opposite to the hinge, and a brace rod connected at its lower end to said base and bearing over said block, and means for detachably coupling said rod at its upper end to said upper member at the side opposite to the hinge.

In testimony whereof, I affix my signature, in presence of two witnesses.

FRANK J. LICHTY.

Witnesses:
B. H. LICHTY,
R. A. FARBIG.